United States Patent
Banerjee et al.

(10) Patent No.: US 12,125,269 B2
(45) Date of Patent: Oct. 22, 2024

(54) SENSOR FUSION

(71) Applicant: Ford Global Technologies, LLC, Dearborn, MI (US)

(72) Inventors: Gaurab Banerjee, Chandler, AZ (US); Vijay Nagasamy, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 17/584,449

(22) Filed: Jan. 26, 2022

(65) Prior Publication Data

US 2023/0237783 A1 Jul. 27, 2023

(51) Int. Cl.
*G06V 10/00* (2022.01)
*G01S 13/86* (2006.01)
(Continued)

(52) U.S. Cl.
CPC .......... *G06V 10/803* (2022.01); *G01S 13/862* (2013.01); *G01S 13/865* (2013.01); *G01S 13/867* (2013.01); *G01S 13/89* (2013.01); *G01S 15/86* (2020.01); *G01S 15/89* (2013.01); *G01S 17/86* (2020.01); *G01S 17/89* (2013.01);
(Continued)

(58) Field of Classification Search
CPC ...... G06V 10/803; G06V 10/82; G06V 20/58; G06V 10/454; G06V 10/764; G06V 20/56; G06V 10/80; G01S 13/862; G01S 13/865; G01S 13/867; G01S 13/89; G01S 15/86; G01S 15/89; G01S 17/86; G01S 17/89; G01S 13/931; G01S 15/931; G01S 17/931; G01S 7/4808; G01S 7/417; G08G 1/0125; G08G 1/017; G08G 1/04; G08G 1/096725;
(Continued)

(56) References Cited

U.S. PATENT DOCUMENTS 10,551,838 B2   2/2020  Liu et al.
2017/0371329 A1* 12/2017 Giering .............. G05B 23/0294
(Continued)

OTHER PUBLICATIONS

Alammar, "The Illustrated Transformer" 2018, https://jalammar.github.io/illustrated-transformer/.
(Continued)

*Primary Examiner* — Van D Huynh
(74) *Attorney, Agent, or Firm* — Frank A. MacKenzie; Bejin Bieneman PLC (57) ABSTRACT

A plurality of images can be acquired from a plurality of sensors and a plurality of flattened patches can be extracted from the plurality of images. An image location in the plurality of images and a sensor type token identifying a type of sensor used to acquire an image in the plurality of images from which the respective flattened patch was acquired can be added to each of the plurality of flattened patches. The flattened patches can be concatenated into a flat tensor and add a task token indicating a processing task to the flat tensor, wherein the flat tensor is a one-dimensional array that includes two or more types of data. The flat tensor can be input to a first deep neural network that includes a plurality of encoder layers and a plurality of decoder layers and outputs transformer output. The transformer output can be
(Continued)

input to a second deep neural network that determines an object prediction indicated by the token and the object predictions can be output.

20 Claims, 9 Drawing Sheets

(51) Int. Cl.

| | | |
|---|---|---|
| G01S 13/89 | (2006.01) | |
| G01S 15/86 | (2020.01) | |
| G01S 15/89 | (2006.01) | |
| G01S 17/86 | (2020.01) | |
| G01S 17/89 | (2020.01) | |
| G06V 10/80 | (2022.01) | |
| G06V 10/82 | (2022.01) | |
| G06V 20/58 | (2022.01) | |
| G01S 13/931 | (2020.01) | |
| G01S 15/931 | (2020.01) | |
| G01S 17/931 | (2020.01) | |

(52) U.S. Cl.
CPC .............. *G06V 10/82* (2022.01); *G06V 20/58* (2022.01); *G01S 13/931* (2013.01); *G01S 15/931* (2013.01); *G01S 17/931* (2020.01)

(58) Field of Classification Search
CPC ..... G08G 1/096766; G06N 3/08; H04W 4/38; H04W 4/44
See application file for complete search history.

(56) References Cited

U.S. PATENT DOCUMENTS

| | | | | |
|---|---|---|---|---|
| 2019/0049958 | A1* | 2/2019 | Liu | G01S 17/00 |
| 2020/0025931 | A1* | 1/2020 | Liang | G06F 18/251 |
| 2021/0012165 | A1* | 1/2021 | Jiang | G01S 13/867 |
| 2021/0056363 | A1* | 2/2021 | Song | G06T 7/10 |
| 2021/0232915 | A1 | 7/2021 | Dalli et al. | |
| 2021/0241026 | A1* | 8/2021 | Deng | G01S 7/497 |
| 2021/0406560 | A1* | 12/2021 | Park | G06T 7/70 |
| 2022/0012848 | A1* | 1/2022 | Ranftl | G06N 3/04 |
| 2022/0161815 | A1* | 5/2022 | Van Beek | B60W 60/00274 |
| 2022/0261590 | A1* | 8/2022 | Brahma | G06V 20/56 |
| 2022/0375211 | A1* | 11/2022 | Tolstikhin | G06V 10/454 |
| 2023/0043931 | A1* | 2/2023 | Urtasun | G06T 7/75 |
| 2024/0062657 | A1* | 2/2024 | Wu | B60W 30/0956 |

OTHER PUBLICATIONS

Dosovitskiy et al., "An Image is Worth 16X16 Words: Transformers for Image Recognition at Scale", Published as a conference paper at ICLR 2021, arXiv:2010.11929v2 [cs.CV] Jun. 3, 2021.

Ng, "Transformer Network Intuition", Coursera, deeplearning.ai, video transcript (2018).

"ViT—An Image is Worth 16X16 Words: Transformers for Image Recognition at Scale" Jan. 18, 2021.

* cited by examiner

SENSOR FUSION

BACKGROUND

Images can be acquired by sensors and processed using a computer to determine data regarding objects in an environment around a system. Operation of a sensing system can include acquiring accurate and timely data regarding objects in the system's environment. A computer can acquire, from one or more image sensors, images that can be processed to determine locations of objects. Object location data extracted from images can be used by a computer to operate systems including vehicles, robots, security, and object tracking systems.

DETAILED DESCRIPTION

A sensing system can acquire data from one or more sensors of one or more sensor types (i.e., sensor modalities) regarding an environment around the system and process the data to determine identities and/or locations of objects. For example, a deep neural network can be trained and then used to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems can include features wherein a computer acquires video data from a camera observing a secure area to provide access to authorized users and detect unauthorized entry in an environment that includes a plurality of users. In a manufacturing system, a deep neural network can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to detect objects, for example vehicles and pedestrians, in a traffic scene and determine a vehicle path for operating a vehicle based on the detected objects. A traffic scene is an environment around a traffic infrastructure system or a vehicle that can include a portion of a roadway and objects including vehicles and pedestrians, etc. For example, a computing device in a vehicle or traffic infrastructure system can be programmed to acquire one or more images from one or more sensors included in the vehicle or the traffic infrastructure system, detect objects in the images and communicate labels that identify the objects along with locations of the objects.

The sensors can include video or still image cameras that acquire images corresponding to visible or infrared wavelengths of light. Sensors can also include lidar sensors, which typically emit infrared wavelengths of light, radar sensors which emit radio waves, and ultrasound sensors which emit sound waves. Lidar, radar, and ultrasound sensors all measure distances to points in the environment. In some examples sensors included in a vehicle can acquire one or more images of a traffic scene and process the images to determine locations of objects included in the images. The location of the objects can permit a computing device in the vehicle to determine a vehicle path upon which to operate the vehicle. In some examples, stationary sensors included in a traffic infrastructure system can provide data regarding objects in a traffic scene to augment data acquired by sensors included in the vehicle, for example.

Advantageously, techniques described herein can improve the ability of a computing device in a vehicle to predict future locations of objects in an environment around the vehicle using data from sensors that acquire multi-modality data. A sensor modality is the type of data that a sensor acquires. For example, a red, green, blue (RGB) video camera can acquire a color image that includes a two-dimensional (2D) array of pixels with pixel values that measure the intensities of light reflected or emitted from surfaces in the environment. Lidar sensors measure distances to surfaces in the environment by emitting laser pulses and measuring the time of flight or phase shift of a returned signal. A radar sensor measures distances to surfaces in the environment by emitting modulated radio waves and measuring a phase shift of the return signal. An ultrasound sensor emits modulated high frequency sound waves and measures the return signal to determine distances to surfaces in the environment. Each of these types of sensors is referred to as a sensor modality and each sensor modality acquires data regarding objects or surfaces in the environment with different qualities depending upon the wavelength of energy emitted and the technique used to acquire the data.

An RGB or infrared camera can acquire data having high spatial resolution in well-lit conditions such as daylight but does not work well in low-visibility conditions. A lidar sensor can determine distances to objects and surfaces in the environment but can have lower spatial resolution than an image sensor. A radar sensor can have even lower spatial resolution but can detect metallic objects with high sensitivity in low-visibility conditions. An ultrasound sensor can have high resolution by has limited range, for example. Combining multiple sensor modalities to detect objects in an environment around a vehicle can benefit from the strengths of each sensor modality while compensating for the weaknesses of each. Combining multiple sensor modalities can provide reliable object detection despite changes in visibility due to weather or time of day, for example.

Combining multi-modality data to detect objects in an environment around a vehicle by processing data from each sensor separately and combining the results can result in dedicating computing resources for each sensor modality. For example, each sensor modality can utilize a separate deep neural network to predict objects. Additional computing resources can be dedicated to combine the predictions output from each deep neural network to determine a single object prediction in a form that can be used by a computing device in a vehicle to operate the vehicle. Advantageously, a multi-modal transformer network as described herein can address inefficiencies with such dedicated resources by receiving input multi-modal sensor data directly (i.e., without intervening neural networks dedicated to specific sensor types) and determining a single output object prediction while using fewer computing resources and less time than systems that employ separate computing resources for each modality.

Disclosed herein is a method, including acquiring a plurality of images from a plurality of sensors and extract a plurality of flattened patches from the plurality of images, adding to each of the plurality of flattened patches an image location in the plurality of images and a sensor type token identifying a type of sensor used to acquire an image in the plurality of images from which the respective flattened patch was acquired. The method further includes concatenating the flattened patches into a tensor and add a task token indicating a processing task to the tensor, wherein the tensor is an array that includes more than one type of data, inputting the tensor to a first deep neural network that includes a plurality of encoder layers and a plurality of decoder layers and outputs transformer output, inputting the transformer output to a second deep neural network that determines an object prediction indicated by the task token, and outputting the object prediction. A vehicle can be operated by determining a vehicle path based on the object prediction. Sensor types can include a video camera, a lidar sensor, a radar sensor, and an ultrasound sensor. The plurality of images can include a camera image, a lidar image, a radar image, and an ultrasound image. The plurality of images can be reformatted to conform to a camera image two-dimensional array, wherein a pixel location in the two-dimensional array determines a ray from a point in the sensor included in the plurality of sensors to the pixel location in the two-dimensional array and wherein a pixel value in the two-dimensional array is determined by a distance from the point in the sensor to a point where the ray intersects a data point included in a lidar point cloud, a radar point cloud, or an ultrasound point cloud.

The flattened patches can be generated by selecting rectangular image portions and copying image pixels from top-left to bottom-right from the rectangular image portions to flattened linear arrays. The decoder layers can include a self-attention layer that includes weights for locations in the tensor that have been determined during training based on ground truth. First add and normalize layer included in the decoder layers can add the input tensors to the weights generated by the self-attention layer and normalizes results to a value of one. Output from the first add and normalize layer can be input to one or more feed forward networks A second add and normalize layer can add the output from the one or more feed forward networks to output from the first add and normalize layer and normalizes results to a value of one. The encoder layers can include a self-attention layer, a first add and normalize layer, an encoder-decoder attention layer, a second add and normalize layer, one or more decoder neural networks and a third add and normalize layer. The processing task identified by the task token can include one or more of object location, object depth estimation, object classification, and object segmentation. The object prediction can include an object's x, y location, an object's distance from the sensor, an object's class label, wherein an object class label includes vehicle or pedestrian, and an image segment based on an object's two-dimensional outline. The self-attention layer can include an attention function that maps a query and set of key-value pairs to an output.

Further disclosed is a computer readable medium, storing program instructions for executing some or all of the above method steps. Further disclosed is a computer programmed for executing some or all of the above method steps, including a computer apparatus, programmed to input an image to a deep neural network to acquire a plurality of images from a plurality of sensors and extract a plurality of flattened patches from the plurality of images, add to each of the plurality of flattened patches an image location in the plurality of images and a sensor type token identifying a type of sensor used to acquire an image in the plurality of images from which the respective flattened patch was acquired. The instructions can include further instructions to concatenate the flattened patches into a tensor and add a task token indicating a processing task to the tensor, wherein the tensor is an array that includes more than one type of data, input the tensor to a first deep neural network that includes a plurality of encoder layers and a plurality of decoder layers and outputs transformer output, input the transformer output to a second deep neural network that determines an object prediction indicated by the task token, and output the object prediction. A vehicle can be operated by determining a vehicle path based on the object prediction. Sensor types can include a video camera, a lidar sensor, a radar sensor, and an ultrasound sensor. The plurality of images can include a camera image, a lidar image, a radar image, and an ultrasound image. The plurality of images can be reformatted to conform to a camera image two-dimensional array, wherein a pixel location in the two-dimensional array determines a ray from a point in the sensor included in the plurality of sensors to the pixel location in the two-dimensional array and wherein a pixel value in the two-dimensional array is determined by a distance from the point in the sensor to a point where the ray intersects a data point included in a lidar point cloud, a radar point cloud, or an ultrasound point cloud.

The instructions can include further instructions to generate the flattened patches by selecting rectangular image portions and copying image pixels from top-left to bottom-right from the rectangular image portions to flattened linear arrays. The decoder layers can include a self-attention layer that includes weights for locations in the tensor that have been determined during training based on ground truth. First add and normalize layer included in the decoder layers can add the input tensors to the weights generated by the self-attention layer and normalizes results to a value of one. Output from the first add and normalize layer can be input to one or more feed forward networks A second add and normalize layer can add the output from the one or more feed forward networks to output from the first add and normalize layer and normalizes results to a value of one. The encoder layers can include a self-attention layer, a first add and normalize layer, an encoder-decoder attention layer, a second add and normalize layer, one or more decoder neural networks and a third add and normalize layer. The processing task identified by the task token can include one or more of object location, object depth estimation, object classification, and object segmentation. The object prediction can include an object's x, y location, an object's distance from the sensor, an object's class label, wherein an object class label includes vehicle or pedestrian, and an image segment based on an object's two-dimensional outline. The self-attention layer can include an attention function that maps a query and set of key-value pairs to an output.

Figure 1:
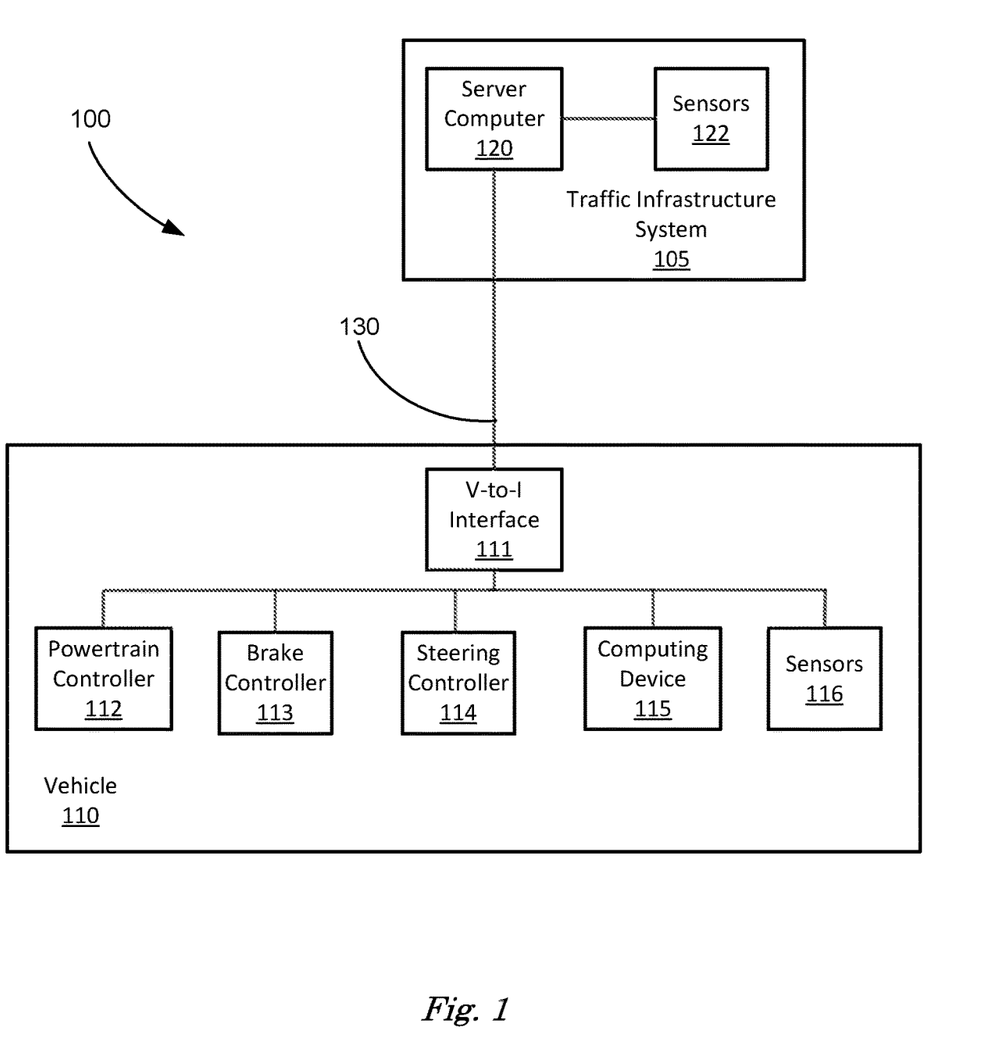
FIG. 1 is a block diagram of an example vehicle management system.

FIG. 1 is a diagram of a system 100 that can include a traffic infrastructure system 105 that includes a server computer 120 and stationary sensors 122. The system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
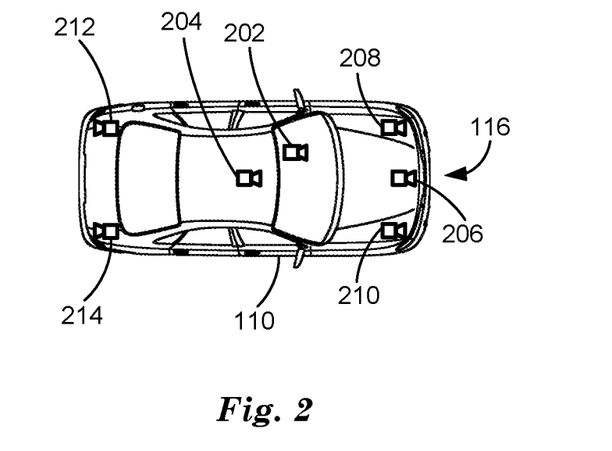
FIG. 2 is a diagram of an example vehicle including sensors.

FIG. 2 is a diagram of an example vehicle 110 having a video camera 202, a lidar sensor 204, a radar sensor 206, two forward-looking ultrasound sensors 208, 210 and two rearward-looking ultrasound sensors 212, 214 (collectively sensors 116). A computing device 115 in a vehicle 110 can acquire sensor data from one or more sensors 116, input the sensor data to a software program to determine data regarding objects in an environment around the vehicle 110. For example, a computing device 115 can use sensor data to determine locations of other vehicles in an environment around a vehicle 110. Computing device 115 can determine a plurality of locations of a vehicle over a plurality of time steps and use the plurality of locations to track the vehicle, where tracking refers to determining a speed and direction of an object. The tracking data can be used by a computing device 115 to predict a future location of another vehicle in an environment around a vehicle 110, for example.

Data regarding objects in an environment around a vehicle 110 determined by processing sensor data acquired from sensors 116 can be used to operate the vehicle 110. For example, a computing device 115 can determine a vehicle path upon which to operate a vehicle 110 that avoids contact or near contact with objects in the environment, including tracking moving objects to predict future locations of the objects. Objects of interest can include other vehicles and pedestrians, for example. A vehicle path can be a polynomial function determined by computing device 115 based on upper and lower limits on lateral and longitudinal accelerations. A computing device 115 can cause a vehicle 110 to travel on a vehicle path by controlling vehicle powertrain, vehicle steering, and vehicle brakes via controllers 112, 113, 114.

Different sensor data acquired by different sensors 116 have differing strengths and weaknesses regarding their ability to acquire data regarding objects in an environment around a vehicle 110. For example, a video camera 202 can acquire image data having high spatial resolution at frame rates up to 60 frames per second. A frame of video data is a two-dimensional (2D) view of light reflected or emitted by objects and surfaces in the environment around the vehicle 110. Video data does not directly provide three-dimensional (3D) data regarding objects and surfaces in the environment. 3D data regarding objects and surfaces in the environment can be inferred by processing video data. For example, an object can be tracked in a plurality of video frames and 3D motion of the object inferred from the tracking data based on data regarding the magnification and 3D pose of the video camera 202 with respect to a ground plane such as a roadway. Determining object data using video camera data can be difficult at night, under low-light conditions, and when weather such as rain or snow obscures the view of the environment obtained by the video camera 202.

A lidar sensor 204 can emit pulses of light, typically in the infrared spectrum range, and acquire return signals reflected from objects and surfaces in the environment to generate point cloud data that includes distances from the lidar sensor 204 to points on the objects and surfaces. Lidar point cloud data typically has lower 2D spatial and temporal resolution than video data but has the advantage of measuring 3D locations at high resolution directly, without further processing. The lower spatial and temporal resolution makes identification and tracking of objects in lidar point cloud data typically more difficult than video data. A lidar sensor also has the advantage of operating at night and under low-light conditions because it emits its own light rather than relying on ambient light. Because it relies on transmitted and reflected light, weather conditions can adversely affect lidar point cloud data in similar fashion to video data.

A radar sensor 206 emits modulated radio waves and acquires return signals reflected from objects and surfaces in the environment. Radar data typically includes high resolution distance data but very low-resolution 2D spatial resolution. Radar data can provide movement data directly by measuring doppler shift in the return data. Radar data has high sensitivity to metallic objects and surfaces that reflect radio wave such as vehicles, buildings and pavement but has low sensitivity to radio wave absorbing objects such as pedestrians and foliage. Radar sensors 206 have the advantage of operating in low-light and most bad weather conditions. Ultrasound sensors 208, 210, 212, 214 have moderate distance resolution and low spatial resolution and only operate over limited distances. For example, ultrasound sensors 208, 210, 212, 214 are typically used for applications such as parking or driving in parking lots or parking structures, where objects and surfaces to be detected are close to the vehicle 110, i.e., within one or two meters.

Multi-modality sensor data can be used by a computing device 115 to overcome limitations of each sensor modality. For example, video camera data can be used to determine a 2D location of an object such as a vehicle. Lidar point cloud data acquired at approximately the same time covering approximately the same field of view as the video camera data can be combined with the processed video camera data to determine the 3D distance to a detected vehicle. Typically, data from each sensor modality is processed separately and results combined after processing. Processing each sensor modality separately requires duplicate computing resources for each sensor modality. Combining the results from multiple sensor modalities requires further processing to determine the conditions under which each sensor modality was operating when the data were acquired. For example, under low-light conditions, less importance can be applied to video data than lidar point cloud data. Additional processing is required to determine environmental conditions that can affect sensor data before combining the results.

Advantageously, multi-modality deep neural network as discussed herein combines multiple sensor modalities and processes the modalities together with a single deep neural network processing system. The deep neural network processing system is trained to evaluate and properly combine data from each sensor depending upon the quality of the input data. The multi-modality deep neural network combines a single input processor with a plurality of output processors to permit a plurality of types of output predictions to be determined while using minimal computing resources.

Figure 3:
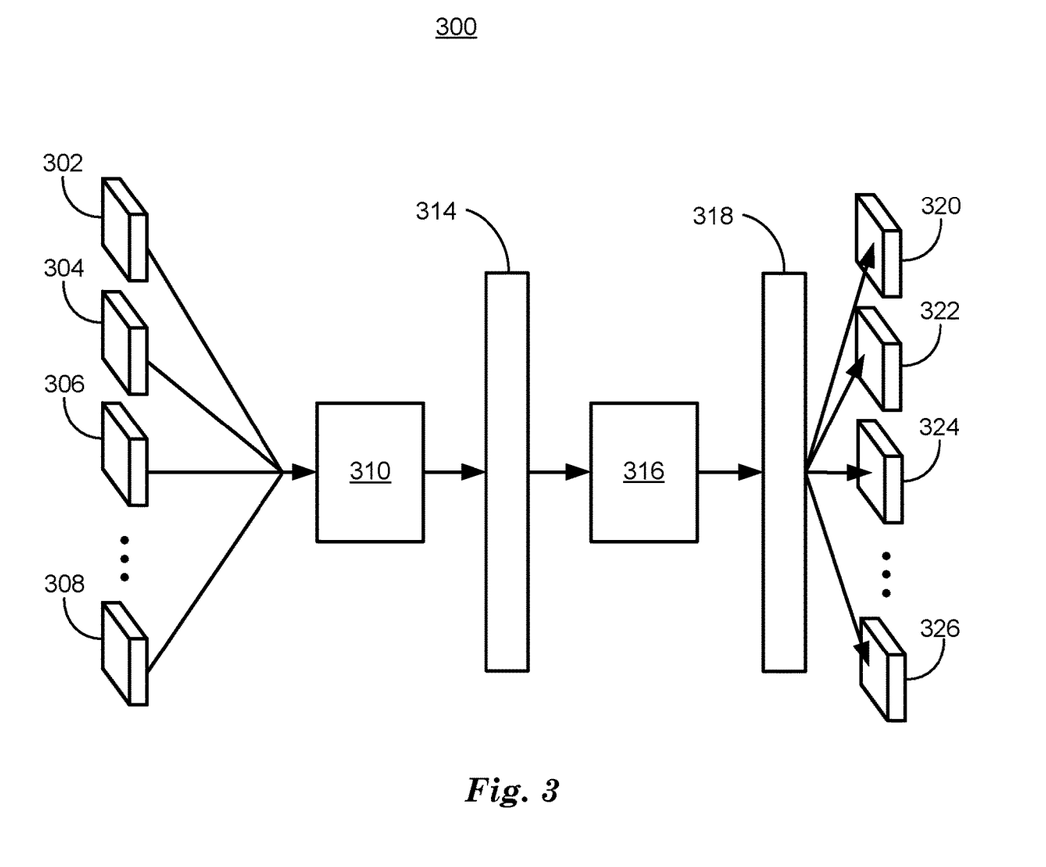
FIG. 3 is a diagram of an example multi-sensor transformer neural network.

FIG. 3 is a diagram of a multi-modal object detection system 300. Multi-modal object detection system 300 takes as input a plurality multi-modal sensor data 302, 304, 306, 308. Sensor data types included in multi-modal sensor data 302, 304, 306, 308 can include video images, lidar point clouds, radar point clouds, and ultrasound data, for example. The plurality of multi-modal sensor data 302, 304, 306, 308 are input to input encoder 310, which formats the multi-modal sensor data 302, 304, 306, 308 into a common format and organizes them into a final input tensor 314 suitable for processing by fusion transformer 316. Input encoder 310 is discussed in relation to FIGS. 4, 5 and 6, below. The final input tensor 314 also includes a token that indicates which type of output object prediction 320, 322, 324, 326 will be performed on the transformer output 318. Fusion transformer 316 is a deep neural network that includes deep neural network encoders, decoder neural networks and attention heads that process the final input tensor 314 to produce a transformer output 318. Transformer output 318. Fusion transformer 316 is discussed in relation to FIG. 7, below.

The fusion transformer 316 transforms the multi-modal input data into a common object format that includes data regarding objects included in the final input tensor 314. Transformer output 318 includes data regarding object labels, locations, size, distance, etc., transformed and encoded suppress any data regarding the source of the object data, i.e., which sensor modality or modalities produced the data. The transformer output 318 also includes a task token which determines which one of the plurality of object prediction networks 320, 322, 324, 326 to be used to process the final input tensor 314. Each object prediction network 320, 322, 324, 326 inputs transformer output 318 and outputs an object prediction regarding the object data identified by a task token included in the transformer output 318. Object prediction includes one or more of object location, object depth estimation, object classification, and object segmentation.

Each of the object prediction networks 320, 322, 324, 326 are trained to determine a single type of object prediction based on output from fusion transformer 316. Input encoder 310 and fusion transformer 316 form a backbone for a plurality of object prediction systems, where each object prediction system includes an input encoder 310, a fusion transformer 316 and one of the object prediction networks 320, 322, 324, 326. The input encoder includes a task in the final input tensor 314 to indicate to the multi-modal object detection system 300 which object prediction network 320, 322, 324, 326 should receive the transformer output 318.

Object prediction networks 320, 322, 324, 326 are deep neural networks trained to input transformer output 318 and output predictions regarding objects included in transformer output 318. An object prediction network 320, 322, 324, 326 can be trained to determine object predictions using ground truth data that includes global coordinate data regarding the objects included in the multi-modal sensor data 302, 304, 306, 308. During training parameters included in the object prediction networks 320, 322, 324, 326 generates weights that have been determined during training to contribute to correct predictions based on ground truth. Object prediction networks 320, 322, 324, 326 can determine an object's x, y location, an object's distance from the sensor, an object's class label, wherein an object class label includes vehicle or pedestrian, and an image segment based on an object's two-dimensional outline.

The real-world location of an object included in multi-modal sensor data can be determined in global coordinates relative to the location of a vehicle 110 that includes the sensors 116. During training, an output object location prediction from the deep neural network being trained to predict object locations can be compared to the ground truth location of the object to determine a loss function. The loss function can be input to the deep neural network to select parameters that permit the deep neural network to determine the correct object location for the input object data. In similar fashion, other deep neural networks can be trained to predict object depth, object class, and object segments based on ground truth determined for each type of prediction. Object depth perception can combine object location data from camera data with object distance data from one or more of lidar sensors, radar sensors and ultrasound sensors. Object classification labels detected object with an object class label, for example "vehicle", "pedestrian", etc. Object segmentation outputs image data including a labeled contiguous region that includes the pixels included in the image of the object in the multi-modality input data.

Figure 4:
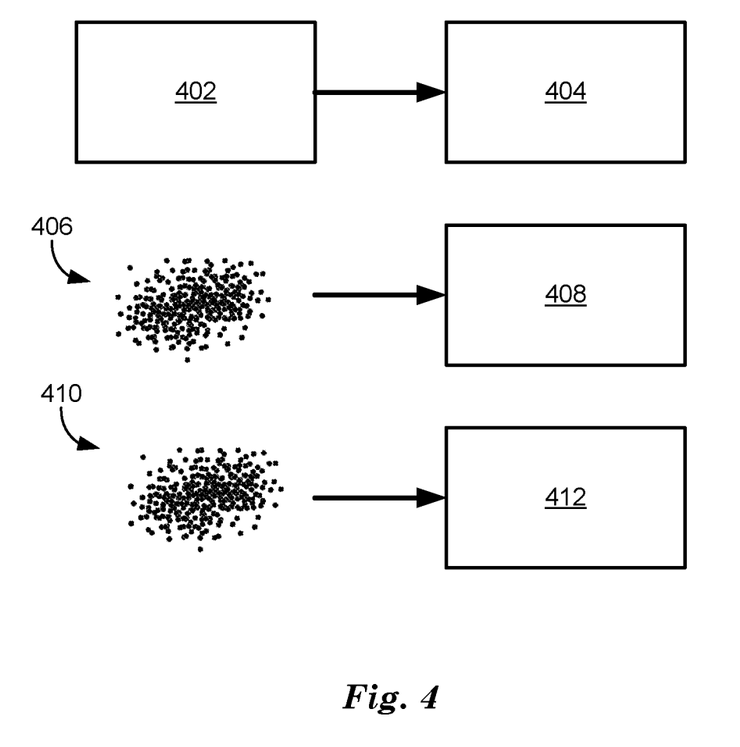
FIG. 4 is a diagram of example multi-sensor images.

FIG. 4 is a diagram of the first step in processing input data by input encoder 310. Input encoder 310 inputs multi-modality data and formats it in a consistent format for processing by fusion transformer 316. All data modalities are formatted to match image data format. Image data is formatted as a rectangular array of pixels with fixed x, y dimensions, for example 1920×1080. FIG. 4 shows an input image 402 being formatted to a consistent image array size and bit depth regardless of the size and bit depth to conform to a camera image two-dimensional array, i.e., output image 404, for further processing. Lidar point cloud data 406, radar point cloud data 410, and ultrasound point cloud data are converted into a lidar image 408, a radar image 412, and an ultrasound image.

A lidar point cloud 406 includes lidar data points having x, y, and z coordinates in a 3D volume. Each lidar data point can have a value proportional to the strength of the return signal or have a value of "1" to indicate the presence of a return signal at that data point in 3D space. The lidar point cloud 406 can be converted to a lidar image 408 data format by assuming that the pixel locations included in the lidar image 408 array are locations of rays emanating from a point in the lidar sensor 204 and passing through each pixel locations of the lidar image 408 array. The value of each pixel in the lidar image 408 array is the distance from the center of the lidar sensor 204 at which the ray passing through the pixel intersects an x, y, z data point in the lidar point cloud 406.

A radar point cloud 410 includes radar data points having x, y, and z coordinates in a 3D volume. Radar data points can have a value proportional to the movement of the object or surface in space as measured by Doppler frequency shift or have a value of "1" to indicate the presence of a return signal at that data point in 3D space. In similar fashion to a lidar point cloud 406, a radar point cloud 410 can be converted to radar image 412 data format by assuming that the pixels included in the radar image 412 array are rays emanating from a point in the radar sensor 206 and passing through each pixel of the radar image 412 array. The value of each pixel in the radar image 412 array is the distance from the center of the radar sensor 204 at which the ray passing through the pixel intersects an x, y, z data point in the radar point cloud 410. Ultrasound images can be formed in a similar fashion a lidar image 408 and a radar image 412.

Figure 5:
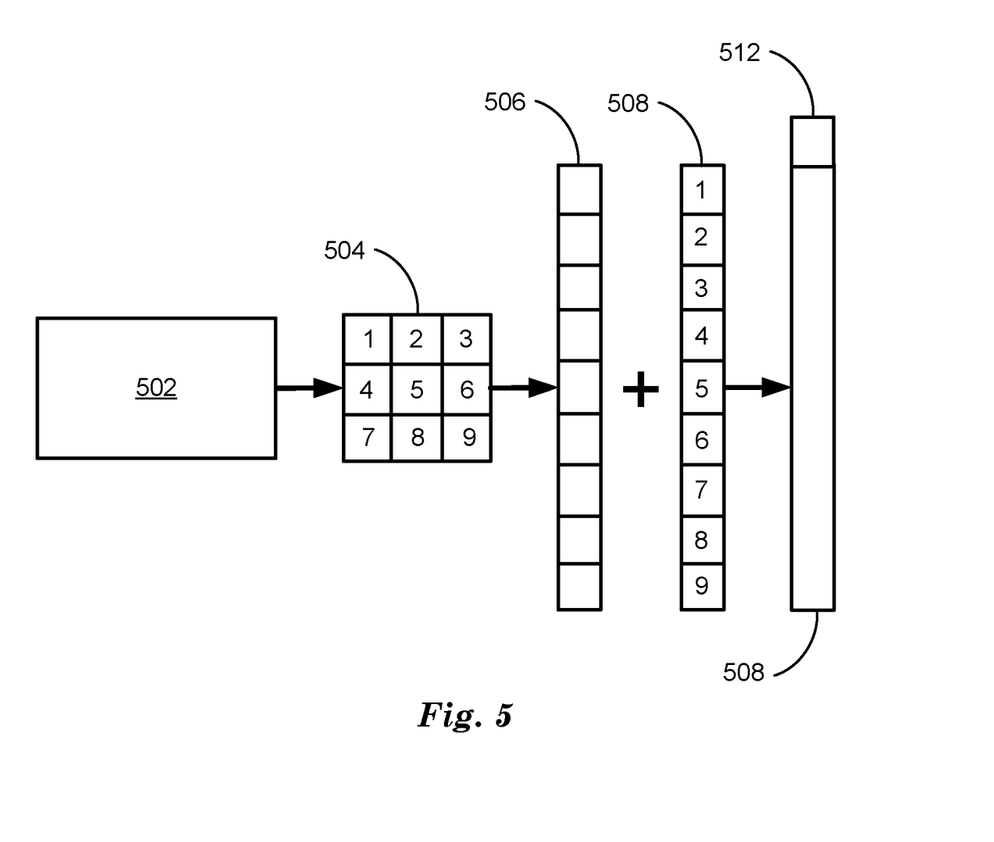
FIG. 5 is a diagram of example image input data.

FIG. 5 is a diagram illustrating how input image 502 data is reformatted for processing by input encoder 310 from FIG. 3. Input image 502 is first divided into a plurality of patches 504. The patches 504 can be i×j patches, where i and j are small integers, for example i=3 and j=3 as illustrated in FIG. 5, i.e., in this example, nine pixels in three rows and three columns. The patches 504 can be contiguous or overlapping and can include full objects or portions of objects to be detected by fusion transformer 316. The flattened patches can be generated by selecting rectangular image portions and copying image pixels from top-left to bottom-right from the rectangular image portions to flattened linear arrays. Patches 504 are first flattened to form flattened linear arrays 506 by emitting pixels from the patches 504 in raster fashion, starting at the upper left pixel of the patch 504 and scanning along rows from the top down as indicated by the numbers included in pixels of patch 504. The pixels from a patch 504 are entered into a flattened linear array 506 and each pixel of the flattened linear array 506 is concatenated with a patch embedding array 508 that includes the pixel address from input image 502 of each pixel in the flattened linear array 506 to form a flattened input tensor 510 by adding a sensor token 512 that indicates which sensor type generated the data included in input image 502. A tensor is an array that includes more than one type of data elements.

Figure 6:
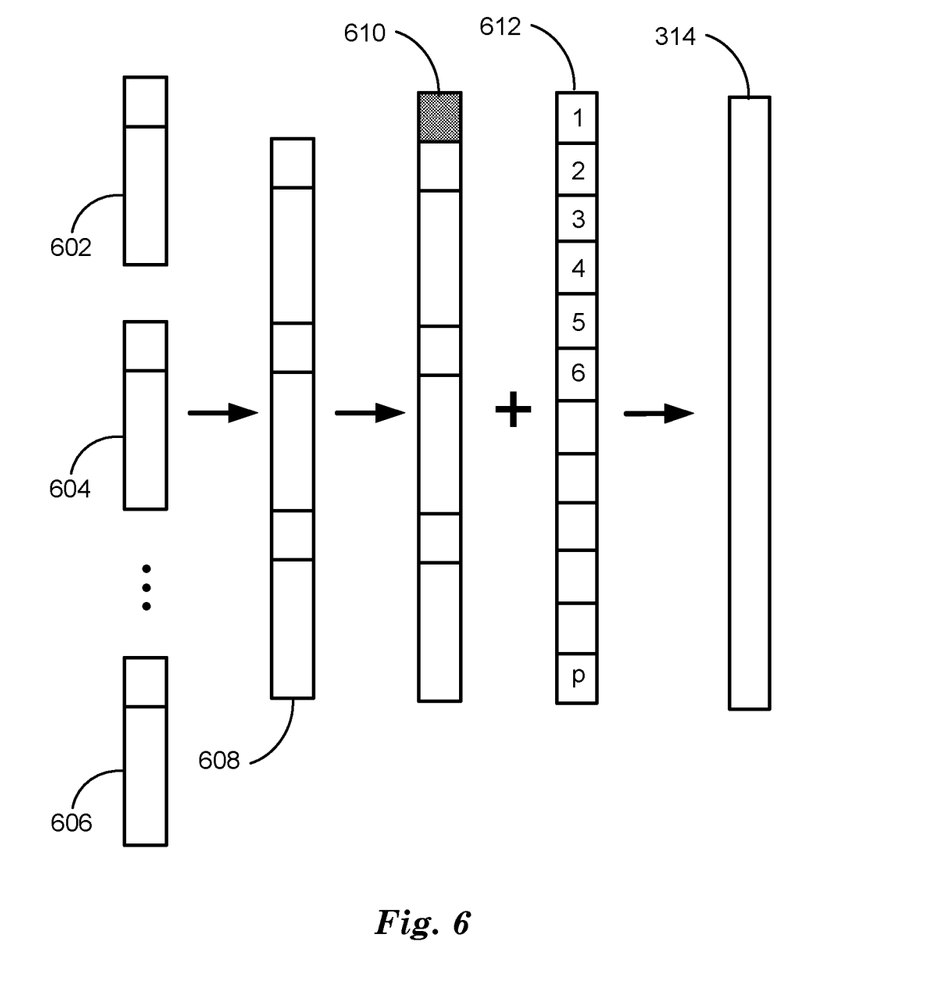
FIG. 6 is a diagram of example multi-sensor image input data.

FIG. 6 is a diagram illustrating how multi-modality flattened input tensors 602, 604, 606 are combined for processing by input encoder 310 from FIG. 3. Flattened input tensors 602, 604, 606 from one or more different types of sensor modalities are concatenated to form a concatenated input tensor 608. A task token 610 is appended to the concatenated input tensor 608 and a position embedding 612 is added to each element in the concatenated input tensor 608 to indicate each data element's position in the final input tensor 314. The task token 610 indicates which object detection task will be performed on the transformer output 318 resulting from processing the final input tensor 314 by fusion transformer 316 by the object prediction network 320, 322, 324, 326 that matches the task token 610.

Figure 7:
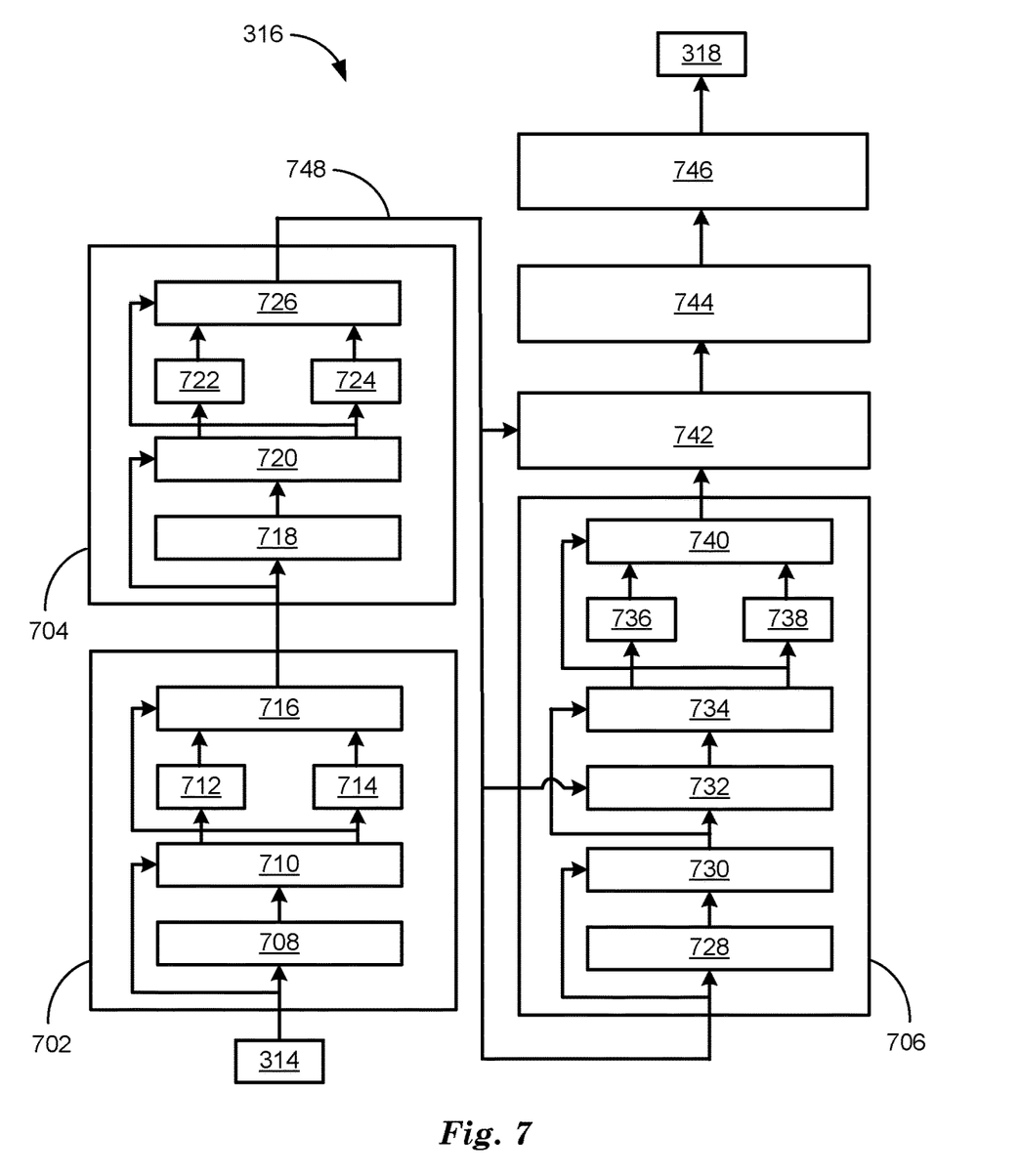
FIG. 7 is a diagram of an example multi-sensor image transformer neural network.

FIG. 7 is a diagram of a fusion transformer 316 deep neural network. Fusion transformer 316 is an attention-based deep neural network that receives as input a final input tensor 314 output by input encoder 310, and outputs a transformer output 318 to one of the plurality of object prediction networks 320, 322, 324, 326. The fusion portion of the fusion transformer 316 refers to the ability of the fusion transformer to combine or fuse together image data from a plurality of sensor modalities into a single result. Attention-based deep neural networks such as fusion transformer 316 include one or more decoder layers 702, 704 followed by one or more encoder layers 706, 742. Encoder layers 702, 704 and decoder layers 706, 742 in fusion transformer 316 perform functions similar to encoder layers and decoder layers included in conventional convolutional neural networks, however, rather than relying on repeated 2D convolution operations on 2D image data to determine connections between spatially distributed data, a fusion transformer 316 inputs data as flattened tensors and determines and adds weights to the flattened tensors to determine connections between spatially distributed data. The weights for locations in the tensor can be determined during training based on ground truth. Determining connections between spatially distributed data in flattened tensors is referred to as a self-attention function because it is determined solely on data input to self-attention layers 708, 718, 728.

An attention function is a process of mapping a query and a set of key-value pairs to an output, where the query, keys, values, and output are all vectors. The output can be determined as a weighted sum of the values, where the weight assigned to each value is computed by a compatibility function of the query with the corresponding key. A query can be determined based on the task token 610 included in the final input tensor 314. For example, a query can be a logical operation based on a statement such as "is the data at this point in the flattened tensor included in an object." In this example a key can be a string of pixels included in a portion of an object in a training dataset and the value can be a measure of how closely pixels at a location in the flattened tensor match the key. Repeated applications of the attention function can combine higher-level keys determined at distant locations in the flattened tensor data can be combined to determine data regarding objects included in the input flattened tensor. By combining data regarding objects from portions of the final input tensor 314 that include data from multiple sensor modalities, the attention function can determine object data based on multi-modality input data.

Starting with first encoder layer 702, a final input tensor 314 is input to a first self-attention layer 708. Because no previous layer processing results are available to first self-attention layer 708, the weights assigned at first self-attention layer 708 can be assigned randomly to begin training. Training a fusion transformer 316 proceeds in the same fashion as training a conventional deep neural network, where a training data set with a plurality of images from a plurality of sensor modalities that include objects to be detected is prepared by users determining the correct answers, or ground truth, to be obtained by the fusion transformer 316. The training dataset is processed a plurality of times while varying the parameters that control the operation of the fusion transformer 316 and determining a loss function that compares the transformer output 318 to the ground truth. By minimizing the loss function, a set of parameters can be determined that train the fusion transformer 316 to produce results that match the ground truth to within a user determined value.

Training fusion transformer 316 is aided by first add and normalization layer 710. The add and normalization layer takes input from the final input tensor 314 and adds it to the output from the self-attention layer 708 and normalizes the result to sum to a value, for example 1. This normalization is performed based on mean and variance values accumulated over the entire training dataset, thereby forcing results to stay within a defined range of values, and preventing anomalous results from skewing the training data, which helps the training converge more quickly on valid results.

Following the first add and normalization layer 710, the normalized results are input to a plurality of feed forward networks 712, 714, where the normalized results are processed in parallel by inputting the normalized results to conventional fully connected neural network nodes. Feed forward networks 712, 714 are fully connected neural networks that calculate linear and/or non-linear functions based on the input flattened tensor data. The output from the feed forward networks 712, 714 is combined with output from the first add and normalize layer 710 at a second add and normalize layer 716. The operation of the second add and normalize layer 716 is the same as described above in relation to the first add and normalize layer 710, where the results are normalized to inhibit anomalous results and speed training.

Second encoder layers 704 operate in similar fashion to first encoder layers 702 and include a second self-attention layer 718, third add and normalize layer 720, a plurality of feed forward networks 722, 724 and a fourth add and normalize layer 726. In second encoder layers 704 the second self-attention layer 718 includes input from the first encoder layers 702 and does not require random input. The results of processing the final input tensor 314 with the first encoder layers 702 is used to guide the second self-attention layer to determine the key, the value and the output vector weights.

Fusion transformer 316 can include a plurality of encoder layers 702, 704. Latent variables 748 output from the last encoder layer 702, 704 is input to the first decoder layer 706. Output from the last encoder layer 704 includes latent variables 748 that encodes object data that combines object data from multiple sensor modalities. The training dataset can include data where an object is obscured in images from one or more of the modalities permitting the fusion transformer 316 to be trained to recognize when object data from one modality can be used in preference to another of the modalities, for example.

Fusion transformer 316 can include a plurality of decoder layers 706, 742. Decoder layers 706, 742 input latent variables 748 to a first decoder self-attention layer that processes the input latent variables 748 in the same fashion as described above in relation to the first self-attention layer. Following the first decoder self-attention layer 728 a first decoder add and normalize layer 730 normalizes the output from the first decoder self-attention layer 728 in combination with input latent variables 748 to permit rapid convergence of results during training as discussed above.

Output from the first decoder add and normalize layer 728 is input to first encoder-decoder attention layer 732 where latent variables 748 input from last encoder layer 704 is combined with the output from the first decoder self-attention layer 728 to help focus processing on portions of the flattened tensor data that the encoder layers 702, 704 have determined are important. Following the first encoder-decoder attention layer 732 a second decoder add and normalize layer 734 normalizes the data as discussed above to permit rapid convergence of results during training. Following the second decoder add and normalize layer 734 a plurality of feed forward networks 736, 738 process each portion of the flattened tensor data in parallel. Feed forward networks 736, 738 are fully connected neural networks that calculate linear and/or non-linear functions based on the input flattened tensor data. Following the feed forward networks 736, 738 a third decoder add and normalize layer 740 normalizes the output from the feed forward networks 736, 738 to permit rapid convergence of results during training.

Output from the first decoder layer 706 is input to the second decoder layer 742 which processes the flattened tensor data in similar fashion to the first decoder layer 706. The fusion transformer 316 can include a plurality of decoder layers 706, 742. Following the decoder layers 706, 742, a linear layer 744 inputs the flattened tensor data output by the decoder layers 706, 742. The linear layer 744 includes a fully connected neural network translates the floating-point numbers output by the decoder layers 706, 742 into integer symbols for object data that can be processed by object prediction networks 320, 322, 324, 326. For example, the integer symbols can be object identifiers, locations in pixel coordinates, object depth, etc. Following the linear layer 744 a Softmax function 746 translates the data output by the decoder layers 706, 742 744 into probabilities, where the object data output by the linear layer 744 are accompanied by fractional numbers that add to one indicating which integer symbol is most likely. Object data and probabilities are output as transformer output 318 the object prediction network 320, 322, 324, 326 indicated by the task token 610.

Object prediction networks 320, 322, 324, 326 are deep neural networks that process the transformer output 318 to form predictions regarding objects included in the multi-modal final input tensor 314. By processing multi-modal data with a single backbone fusion transformer 316, both training and operation of a multi-modal object detection system 300 can be made more efficient in the use of computing resources and time. A multi-modal object detection system 300 using a single fusion transformer 316 backbone can be trained more quickly using a smaller training dataset than attempting to train a plurality of deep neural networks for each modality. Because the fusion transformer 316 backbone can be trained to recognize relative strengths and weaknesses of the various modality data, no additional training and post processing is required to determine how to combine multi-modal data. Training of object prediction networks 320, 322, 324 326 becomes more efficient because they all rely on a common data format that suppresses any differences caused by differing data modalities.

Figure 8:
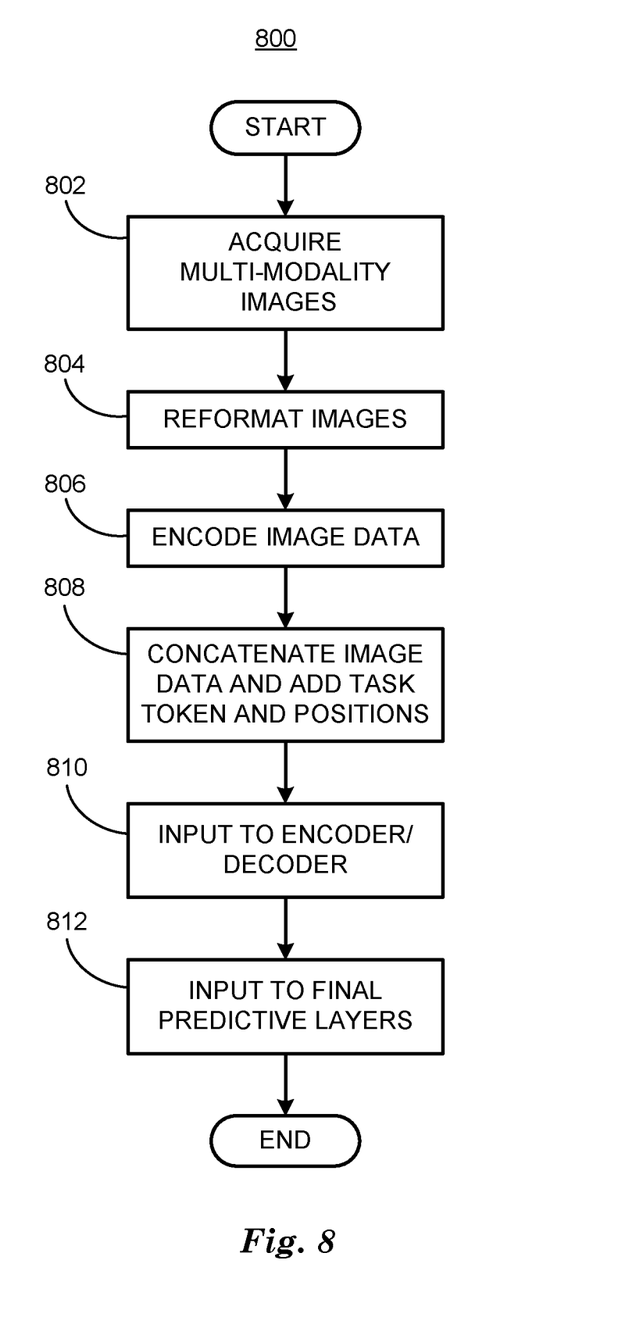
FIG. 8 is a flowchart diagram of an example process to determine object predictions.

FIG. 8 is a flowchart, described in relation to FIGS. 1-7, of a process 800 for determining detecting objects in image data acquired by multi-modality sensors 116 included in a vehicle 110. Process 800 can be implemented by a processor of a computing device 115, taking as input image data from sensors 116 executing commands, and outputting object predictions. Process 800 includes multiple blocks that can be executed in the illustrated order. Process 800 could alternatively or additionally include fewer blocks or can include the blocks executed in different orders.

Process 800 begins at block 802, where a computing device 115 inputs multi-modality sensor data. The multi-modality data can include an image acquired by one or more of a video camera 202, lidar point cloud data acquired by a lidar sensor 204, radar point cloud data acquired by a radar sensor 206, and ultrasound point cloud data acquired by an ultrasound sensor 208, 210, 212, 214.

At block 804 computing device 115 reformats one or more of the lidar point cloud data 406, the radar point cloud data 410, and ultrasound point cloud data to match the image 404 array acquired from a video camera as discussed in relation to FIG. 4, above.

At block 806 computing device 115 encodes the reformatted multi-modality data into flattened input tensors 510 as discussed in relation to FIG. 5, above.

At block 808 computing device 115 concatenates the flattened input tensors 602, 604, 606 into a final input tensor 314 as discussed in relation to FIG. 6, above.

At block 810 final input tensor 314 is input to a fusion transformer 316 to process the final input tensor 314 and determine object data and probabilities that are output as transformer output 318 as discussed in relation to FIG. 7, above.

At block 812 the object data and probabilities output as transformer output 318 by fusion transformer 316 are input to one of a plurality of object prediction networks 320, 322, 324, 326 to predict object labels, object locations, object depth, etc. Following block 812 process 800 ends.

Figure 9:
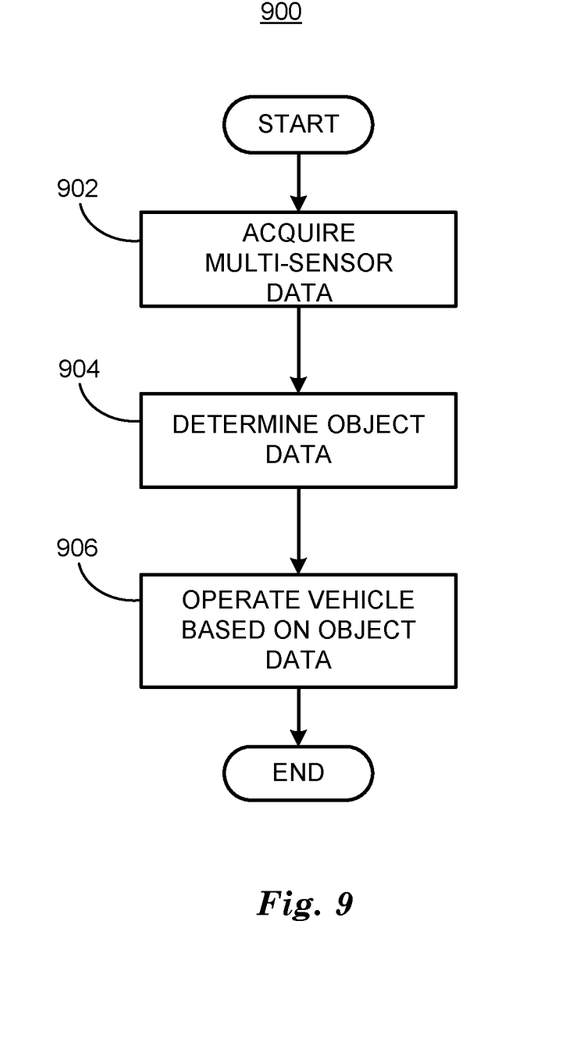
FIG. 9 is a flowchart diagram of an example process to operate a vehicle based on an object prediction.

FIG. 9 is a diagram of a flowchart, described in relation to FIGS. 1-8, of a process for operating a vehicle 110 based determining an object prediction based on a process 800 described in relation to FIG. 8, above. Process 900 can be implemented by a processor of a computing device 115, taking as input data from sensors 116, and executing commands, and operating vehicle 110. Process 900 includes multiple blocks that can be executed in the illustrated order. Process 900 could alternatively or additionally include fewer blocks or can include the blocks executed in different orders.

Process 900 begins at block 902, where a computing device 115 in a vehicle 110 acquires multi-modality data regarding an environment around the vehicle 110.

At block 904 computing device 115 determined object data and probabilities associated with the object data using a multi-modal object detection system 300 as described in relation to FIGS. 3-8, above.

At block 906 computing device 115 outputs commands to controllers 112, 113, 114 to control vehicle powertrain, vehicle steering, and vehicle brakes to control vehicle motion to operate vehicle 110 along a vehicle path determined based on the object data and probabilities determined at block 904. Following block 906 process 900 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
   acquire a plurality of images from a plurality of sensors and extract a plurality of flattened patches from the plurality of images;
   add to each of the plurality of flattened patches an image location in the plurality of images and a sensor type token identifying a type of sensor used to acquire an image in the plurality of images from which the respective flattened patch was acquired;
   concatenate the plurality of flattened patches into a tensor and add a task token indicating a processing task to the tensor, wherein the tensor is an array that includes more than one type of data;
   input the tensor to a first deep neural network that includes a plurality of encoder layers and a plurality of decoder layers and outputs transformer output;
   input the transformer output to a second deep neural network that determines an object prediction indicated by the task token; and
   output the object prediction.

2. The computer of claim 1, the instructions including further instructions to operate a vehicle by determining a vehicle path based on the object prediction.

3. The computer of claim 1, wherein sensor types include a video camera, a lidar sensor, a radar sensor, and an ultrasound sensor.

4. The computer of claim 1, wherein the plurality of images includes a camera image, a lidar image, a radar image, and an ultrasound image.

5. The computer of claim 4, the instructions including further instructions to reformat the plurality of images to conform to a camera image two-dimensional array, wherein a pixel location in the two-dimensional array determines a ray from a point in the sensor included in the plurality of sensors to the pixel location in the two-dimensional array and wherein a pixel value in the two-dimensional array is determined by a distance from the point in the sensor to a point where the ray intersects a data point included in a lidar point cloud, a radar point cloud, or an ultrasound point cloud.

6. The computer of claim 1, the instructions including further instructions to generate the flattened patches by selecting rectangular image portions and copying image pixels from top-left to bottom-right from the rectangular image portions to flattened linear arrays.

7. The computer of claim 1, wherein the decoder layers include a self-attention layer that includes weights for locations in the tensor that have been determined during training based on ground truth.

8. The computer of claim 7, wherein the first add and normalize layer included in the decoder layers add the input tensors to the weights generated by the self-attention layer and normalizes results to a value of one.

9. The computer of claim 8, wherein output from the first add and normalize layer is input to one or more feed forward networks.

10. The computer of claim 9, wherein a second add and normalize layer adds the output from the one or more feed forward networks to output from the first add and normalize layer and normalizes results to a value of one.

11. The computer of claim 1, wherein the encoder layers include a self-attention layer, a first add and normalize layer, an encoder-decoder attention layer, a second add and normalize layer, one or more decoder neural networks and a third add and normalize layer.

12. The computer of claim 1, wherein the processing task identified by the task token includes one or more of object location, object depth estimation, object classification, and object segmentation.

13. The computer of claim 1, wherein the object prediction includes an object's x, y location, an object's distance from the sensor, an object's class label, wherein an object class label includes vehicle or pedestrian, and an image segment based on an object's two-dimensional outline.

14. A method, comprising:
acquiring a plurality of images from a plurality of sensors and extracting a plurality of flattened patches from the plurality of images;
adding to each of the plurality of flattened patches an image location in the plurality of images and a sensor type token identifying a type of sensor used to acquire an image in the plurality of images from which the respective flattened patch was acquired;
concatenating the plurality of flattened patches into a tensor and adding a task token indicating a processing task to the tensor, wherein the tensor is an array that includes more than one type of data;
inputting the tensor to a first deep neural network that includes a plurality of encoder layers and a plurality of decoder layers and outputs transformer output;
inputting the transformer output to a second deep neural network that determines an object prediction indicated by the task token; and
outputting the object prediction.

15. The method of claim 14, further comprising operating a vehicle by determining a vehicle path based on the object prediction.

16. The method of claim 14, wherein sensor types include a video camera, a lidar sensor, a radar sensor, and an ultrasound sensor.

17. The method of claim 14, wherein the plurality of images includes a camera image, a lidar image, a radar image, and an ultrasound image.

18. The method of claim 17, further comprising reformatting the plurality of images to conform to a camera image two-dimensional array, wherein a pixel location in the two-dimensional array determines a ray from a point in the sensor included in the plurality of sensors to the pixel location in the two-dimensional array and wherein a pixel value in the two-dimensional array is determined by a distance from the point in the sensor to a point where the ray intersects a data point included in a lidar point cloud, a radar point cloud, or an ultrasound point cloud.

19. The method of claim 14, further comprising generating the flattened patches by selecting rectangular image portions and copying image pixels from top-left to bottom-right from the rectangular image portions to flattened linear arrays.

20. The method of claim 14, wherein the decoder layers include a self-attention layer that includes weights for locations in the tensor that have been determined during training based on ground truth.

* * * * *